March 11, 1930.  A. A. KORN  1,750,408
CUSHION WHEEL
Filed May 24, 1928
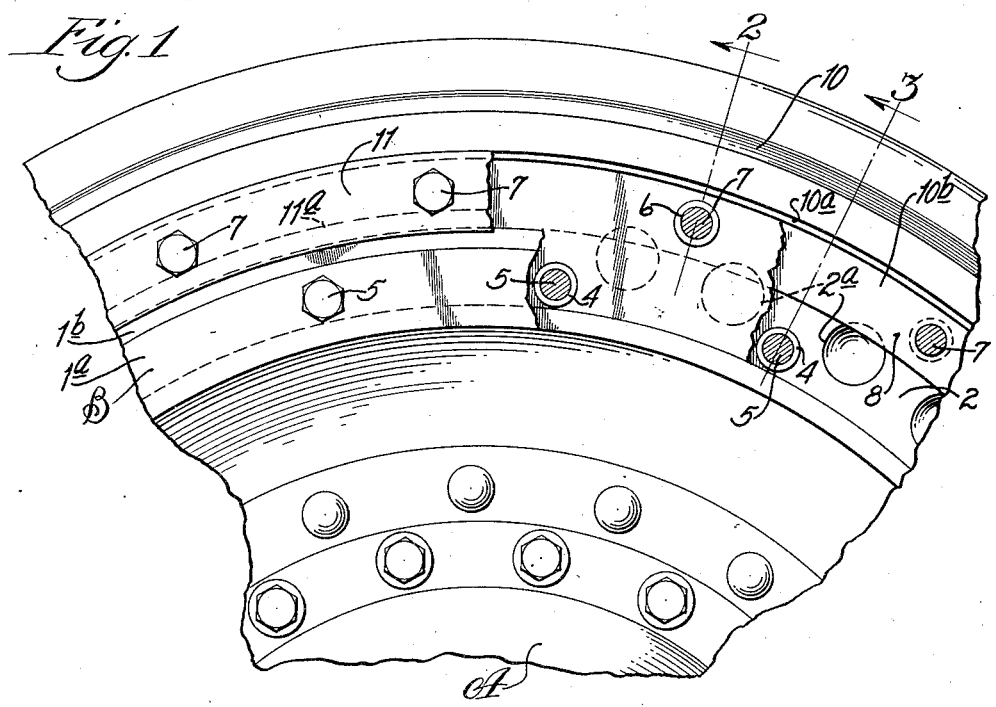

Patented Mar. 11, 1930

1,750,408

UNITED STATES PATENT OFFICE

ALEX A. KORN, OF CHICAGO, ILLINOIS, ASSIGNOR TO MORAND CUSHION WHEEL CO., OF CHICAGO, ILLINOIS, A CORPORATION OF ILLINOIS

CUSHION WHEEL

Application filed May 24, 1928. Serial No. 280,181.

This invention relates to improvements in cushion wheels, and more particularly such wheels adapted for use in connection with railroad locomotives, cars, vehicles, and motor vehicles.

One of the features of my invention is the provision of such a wheel with an outer and inner rim adapted to interlock in the event the cushion material fails.

Other features and advantages of my invention will appear more fully as I proceed with my specification.

In that form of device embodying the features of my invention shown in the accompanying drawings, Fig. 1 represents a broken view, partly in elevation, and partly in section; Fig. 2 is a view taken as indicated by the line 2 of Fig. 1; Fig. 3 is a view taken as indicated by the line 3 of Fig. 1, and Fig. 4 is a view similar to Fig. 2, showing a modified form.

As shown in the drawings, A represents the felly supporting an inner annular channel-form cushion rim, indicated by B.

Lying outside of the inner rim B is an outer annular channel-form rim composed of an outer annular tread 10 with annular shoulders 10$^a$ near the outer edges of its inner surface, and flange rings 11, 11, with their outer edges lying against said shoulders. I refer to the tread 10 with the rings 11 as constituting an outer annular channel-form rim.

Between the outer and inner rims are two annular elastic rubber cushion members 2, which are provided at their inner or adjacent sides with an annular series of recesses 2$^a$.

Inside of the tread member 11 there is preferably provided a metal inner stiffening ring or flange 10$^b$.

The cushion members 2 are provided with an inner annular series of perforations which register with each other and which have inserted therein metal spacing sleeves 4. The perforations register with perforations in the flanges 1$^a$ of the inner rim B and the cushion members are secured to these flanges by means of a series of bolts 5. The spacing sleeves 4 abut against each other at their inner ends and abut against the flanges 1$^a$ at their outer ends.

The cushion members 2 are further provided in their outer circumferential portions with a series of perforations in which are contained spacing sleeves 6. These spacing sleeves are disposed between the central rib 10$^b$ and the flange rings 11. Bolts 7 serve to hold the rings 11 against the shoulders 10$^a$ of the tread 10 and also assist in holding the cushion members 2 in place.

The recesses 2$^a$ are of circular contour, as shown in Fig. 1, and the inner series of bolts 5 are staggered with relation to the outer series of bolts 7, as shown in Fig. 1.

The rubber cushion members 2 are provided at the inner sides of their outer circumferential portions with complemental annular recesses 8, which serve to accommodate the reinforcing rim 10$^b$.

The outer edges of the flanges 1$^a$ are provided with opposed bevels 1$^b$ and the inner edges of the rings 11 are provided with complemental bevels 11$^a$ to cause interlocking of said rims upon movement of the same toward each other in case of failure of the cushion members 2.

In the modified form shown in Fig. 4, I provide a tread portion 110, similar to the tread portion 10 in the preferred form, but instead of providing shoulders on its inner surface and rings 11, 11, seating against such shoulders, I provide a channel-form member 210 having one of its side flanges 111$^a$ removable. It is to be understood that the tread 110 is mounted on the channel-member 210 in any suitable manner, as by shrinking. The permanent side flange of the channel member is indicated by 210$^a$. In this modified form the permanent flange 210$^a$ and the removable flange 111$^a$ correspond to the two rings 11, 11, in the preferred form. In other respects the construction is the same.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent is:

1. A cushion wheel construction comprising; an inner annular channel-form rim and an outer annular channel-form rim, said rims being separated by an annular space and having their flanges extending toward each other, the edges of the flanges of one rim having opposed bevels and the adjacent edges of the flanges of the other rim having complemental bevels to cause interlocking of said flanges upon movement of one rim towards the other; and an interposed cushion element in the annular space between said rims.

2. A cushion wheel construction comprising; an outer annular channel-form rim composed of an outer annular tread rim with annular shoulders near the outer edges of its inner surface and outer flange rings with their outer edges lying against said shoulders and having their inner edges beveled; an inner annular channel-form rim with its flanges extending outwardly toward the flange rings of the outer annular ring, the outer edges of said flanges having complemental bevels with respect to the bevels on the inner edges of the outer flange rings to cause interlocking of the rims upon movement towards each other; and an interposed cushion element lying between said rims.

In witness whereof, I have hereunto set my hand this 21st day of May, 1928.

ALEX A. KORN.